United States Patent
Kwon (10) Patent No.: US 12,068,003 B2
(45) Date of Patent: Aug. 20, 2024

(54) ELECTRONIC APPARATUS AND CONTROL METHOD THEREOF

(71) Applicant: Samsung Electronics Co., Ltd., Suwon-si (KR)

(72) Inventor: Jaesung Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 17/561,233

(22) Filed: Dec. 23, 2021

(65) Prior Publication Data

US 2022/0165296 A1 May 26, 2022

Related U.S. Application Data (63) Continuation of application No. PCT/KR2021/015777, filed on Nov. 3, 2021.

(30) Foreign Application Priority Data

Nov. 20, 2020 (KR) .................. 10-2020-0156912

(51) Int. Cl.
*G10L 25/84* (2013.01)
*G10L 15/22* (2006.01)

(52) U.S. Cl.
CPC .............. *G10L 25/84* (2013.01); *G10L 15/22* (2013.01); *G10L 2015/223* (2013.01)

(58) Field of Classification Search
CPC .... G10L 25/84; G10L 15/22; G10L 2015/223
See application file for complete search history.

(56) References Cited

U.S. PATENT DOCUMENTS

| | | |
|---|---|---|
| 2012/0330651 A1 | 12/2012 | Obuchi et al. |
| 2013/0226586 A1 | 8/2013 | Jang et al. |
| 2015/0301796 A1* | 10/2015 | Visser ............... G10L 17/22 715/728 |
| 2018/0102125 A1* | 4/2018 | Ko ............... G10L 15/04 |
| 2018/0286425 A1 | 10/2018 | Baek et al. |
| 2019/0042565 A1 | 2/2019 | Choi et al. |
| 2020/0211539 A1 | 7/2020 | Lee |
| 2020/0320975 A1* | 10/2020 | Spata ............ G10L 15/22 |
| 2021/0272573 A1* | 9/2021 | Yousefi ............ G06N 3/044 |

FOREIGN PATENT DOCUMENTS

| | | |
|---|---|---|
| JP | 2013-7764 A | 1/2013 |
| KR | 10-1843079 B1 | 5/2018 |
| KR | 10-2018-0111271 A | 10/2018 |
| KR | 10-2020-0084458 A | 7/2020 |
| KR | 10-2158739 B1 | 9/2020 |

OTHER PUBLICATIONS

Written Opinion of the International SEarch Authority dated Feb. 15, 2022 in PCT Application No. PCT/KR2021/015777.

* cited by examiner

*Primary Examiner* — Bhavesh M Mehta
*Assistant Examiner* — Edward Tracy, Jr.
(74) *Attorney, Agent, or Firm* — STAAS & HALSEY LLP (57) ABSTRACT

An electronic apparatus including a processor configured to receive a first audio signal, obtain a second audio signal by relating noise to the received first audio signal, identify whether the second audio signal matches a second command obtained by relating the noise to a first command of first reference data, based on second reference data, obtained by relating the noise to the first reference data, and perform an operation based on identification in response to the identifying that the second audio signal matches the second command.

14 Claims, 8 Drawing Sheets

ELECTRONIC APPARATUS AND CONTROL METHOD THEREOF

CROSS-REFERENCE TO RELATED THE APPLICATION

This application is a continuation application, under 35 U.S.C. § 111(a), of International Patent Application No. PCT/KR2021/015777, filed on Nov. 3, 2021, which claims the priority benefit of Korean Patent Application No. 10-2020-0156912 filed on Nov. 20, 2020 in the Korean Intellectual Property Office, the disclosure of which is incorporated by reference herein in its entirety.

1. FIELD

The disclosure relates to an electronic apparatus and a control method thereof, in which a user voice collected in surrounding environments is subjected to speech recognition and an operation corresponding to a user's voice is performed, and more particularly to an electronic apparatus, which copes with noise when a user voice with the noise is collected in surrounding environments, and a method of controlling the same.

2. DESCRIPTION OF RELATED ART

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio processing; home appliances for miscellaneous household chores; etc. The image processing apparatus may be embodied as a display apparatus that displays an image based on processed image data on its own display panel. Such an electronic apparatus may have various functions for a user's convenience. For example, the electronic apparatus may have a speech recognition function of recognizing input user voice collected from surrounding environments, and perform an operation instructed by the recognized user voice.

There are many considerations for enhancing reliability of results from speech recognition of user voice. For example, such considerations include identification of how correctly an audio component voiced by a user is extracted from an audio of a sound collected by a microphone, identification of who voices the extracted audio component, etc. The electronic apparatus is required to improve the accuracy of such considerations, but the improvement of the accuracy is mainly hindered by noise. As an example of identifying a user who makes voice, the electronic apparatus generates a user identification model by previously registering a first audio caused by specific user voice, and identifies a user who voices a second audio by comparing the second audio with the user identification model when the second audio voiced by someone for subsequent speech recognition is received.

However, in such an identification method, the noise causes difference between a sound collection environment at a first point in time for collecting the first audio to generate the user identification model and a sound collection environment at a second point in time for collecting the second audio to perform speech recognition. The noise may be minimized under the sound collection environment at the first point in time, but the noise may be so high as to be previously predicted under the sound collection environment at the second point in time. Due to such difference between the sound collection environments, the method of using the user identification model to identify a user who makes voice is decreased in accuracy.

To make up for the foregoing method, various noise environments may be predicted to prepare a lot of noise data, and the prepared noise data may be used to improve the accuracy. However, it is difficult to predict all the noise environments a user may experience, and use of a lot of noise data burdens a system in many ways even though the noise environments are predictable.

Accordingly, an electronic apparatus may be needed to reduce the burden on the system as far as possible and improve the accuracy of identifying a user who makes voice under the sound collection environment where there may be various kinds of noise.

SUMMARY

According to an embodiment of the disclosure, there is provided an electronic apparatus including: a processor configured to: receive a first audio signal; obtain a second audio signal by relating noise to the received first audio signal, identify whether the second audio signal matches a second command obtained by relating the noise to first command of first reference data, based on second reference data obtained by relating the noise to the first reference data, and perform an operation in response to the identifying that the second audio signal matches the second command.

The processor may be further configured to identify a user who voices the first audio signal as a user corresponding to the first command, in response to the identifying that the second audio signal matches the second command.

The processor may be configured to provide a message of failing to identify a user who voices the first audio signal, in response to the identifying that the second audio signal does not match the second command.

The processor may be further configured to identify that the second audio signal matches the second command, based on similarity exceeding a preset value between the second command and the second audio signal.

The processor may be further configured to identify that the first audio signal matches the first command, based on similarity exceeding a first setting value between the first command and the first audio signal.

The processor may be further configured to identify that the first audio signal matches the first command, based on similarity exceeding a second setting value between the second command and the first audio signal.

The processor may be further configured to obtain the first command voiced by a user in a surrounding environment from which the noise is excluded, and register the first command to the first reference data.

The processor may be further configured to obtain the second command based on the first command and the noise, and register the second command to the second reference data.

The processor may be further configured to obtain the second audio signal based on the first audio signal and the noise.

Data about the noise to obtain the second command may be the same as data about the noise to obtain the second audio signal.

The processor may be further configured to obtain data about the noise from an audio signal acquired through a microphone set.

According to an embodiment of the disclosure, there is provided a method of controlling an electronic apparatus, including: receiving a first audio signal; obtaining a second audio signal by relating noise to the received first audio signal, identifying whether the second audio signal matches a second command obtained by relating the noise to a first command of first reference data, based on second reference data obtained by relating the noise to the first reference data, and performing an operation based on identification that the second audio signal matches the second command.

The method further comprises identifying a user who voices the first audio signal as a user corresponding to the first command, in response to the identifying that the second audio signal matches the second command.

The method further comprises providing a message of failing to identify a user who voices the first audio signal, in response to the identifying that the second audio signal does not match the second command.

The method further comprises identifying that the second audio signal matches the second command, based on similarity exceeding a preset value between the second command and the second audio signal.

The method further comprises identifying that the first audio signal matches the first command, based on similarity exceeding a first setting value between the first command and the first audio signal.

The method further comprises identifying that the first audio signal matches the first command, based on similarity exceeding a second setting value between the second command and the first audio signal.

The method further comprises obtaining the first command voiced by a user in a surrounding environment from which the noise is excluded, and register the first command to the first reference data.

The method further comprises obtaining the second command based on the first command and the noise, and register the second command to the second reference data.

The method further comprises obtaining the second audio signal based on the first audio signal and the noise.

Data about the noise to obtain the second command may be the same as data about the noise to obtain the second audio signal.

The method further comprises obtaining data about the noise from an audio signal acquired through a microphone set.

BRIEF DESCRIPTION OF THE DRAWINGS

The above and other aspects, features, and advantages of certain embodiments of the present disclosure will be more apparent from the following description taken in conjunction with the accompanying drawings, in which.

MODE FOR INVENTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms. The terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
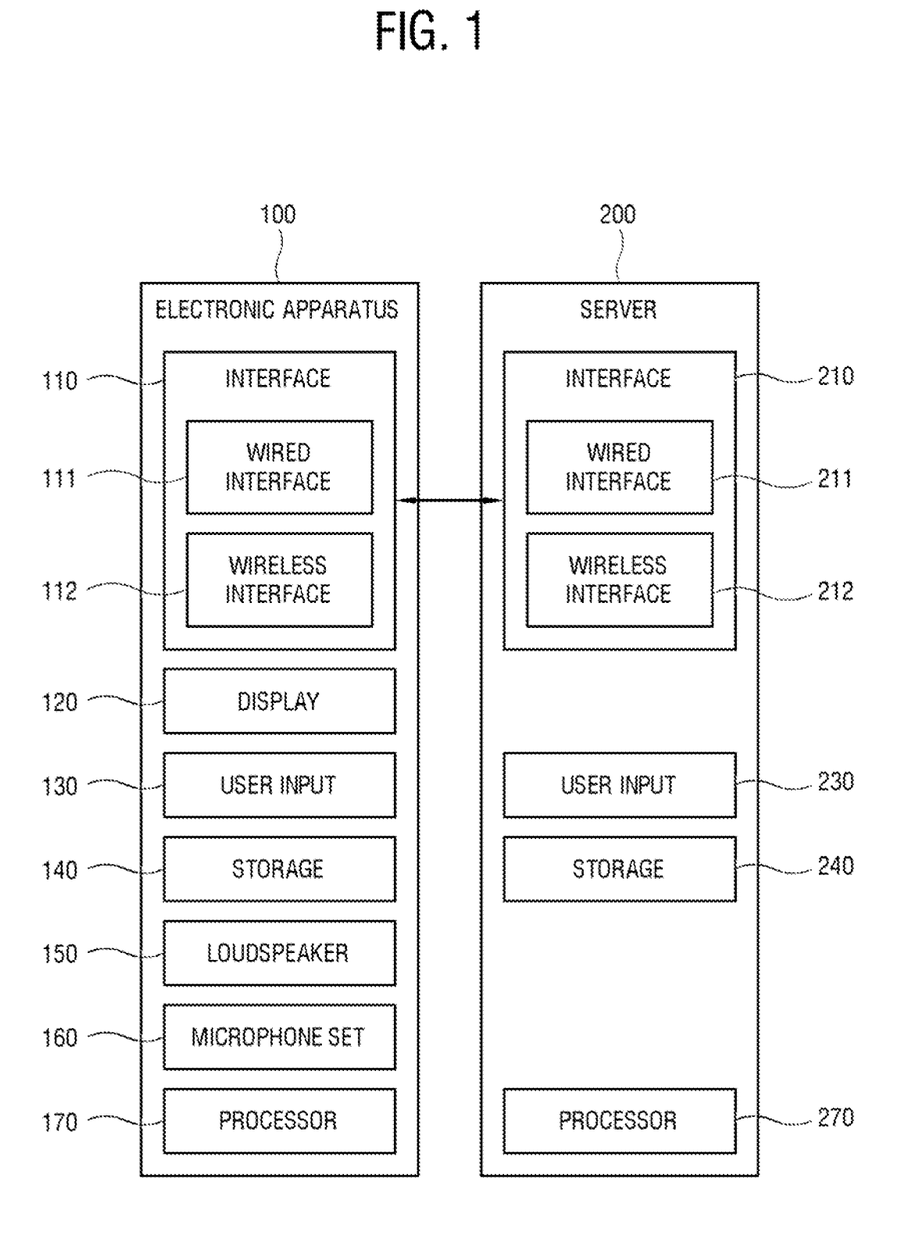
FIG. 1 is a block diagram of an electronic apparatus.

FIG. 1 is a block diagram of an electronic apparatus.

As shown in FIG. 1, a system for processing user voice through speech recognition includes an electronic apparatus 100 that collects a sound of a user's voice, and a server 200 that performs speech recognition for an audio signal of the sound collected by the electronic apparatus 100 and allows the electronic apparatus 100 to perform an operation corresponding to the user's voice. This embodiment describes a method, by which the server 200 performs the speech recognition, among various methods of carrying out the speech recognition. However, the speech recognition system is not limited to this embodiment. For example, the electronic apparatus 100 may autonomously perform the speech recognition without transmitting an audio signal based on sound collection to the server 200.

The electronic apparatus 100 may for example be embodied by various apparatuses, such as a television (TV), a monitor, a digital signage, an electronic blackboard, an electronic frame, or the like stationary display apparatus; a set-top box, an optical media player or the like image processing apparatus; a computer or the like information processing apparatus; a smartphone, a tablet device or the like mobile device; a camera, a camcorder or the like image capturing device; a washing machine, a refrigerator, a clothing manager, an air conditioner, an electric cleaner or the like home appliances; a wearable device that is worn on a user's body; a hub, a gateway, a router, an access point (AP) or the like communication device; etc.

The electronic apparatus 100 and the server 200 include various hardware elements for operations. This embodiment describes a case where the electronic apparatus 100 is a TV. However, the electronic apparatus 100 may be embodied by various kinds of apparatuses as described above, and elements to be described below may be varied depending on what is the kind of electronic apparatus 100.

The electronic apparatus 100 may include an interface 110. The interface 110 includes an interface circuit through which the electronic apparatus 100 performs communication with various external apparatuses such as the server 200 and transmits and receives data. The interface 110 may include at least one of one or more wired interfaces 111 for wired communication, or one or more wireless interface 112 for wireless communication according to connection types.

The wired interface 111 includes a connector or port to which a cable of previously defined transmission standards is connected. For example, the wired interface 111 includes a port connecting with a terrestrial or satellite antenna to receive a broadcast signal or connecting with a cable for cable broadcasting. Further, the wired interface 111 include ports to which cables of various wired transmission standards such as high definition multimedia interface (HDMI), DisplayPort (DP), digital video interactive (DVI), component, composite, S-video, thunderbolt, and the like to connect with various image processing apparatuses. Further, the wired interface 111 includes a port of universal serial bus (USB) standards to connect with a USB device. Further, the wired interface 111 includes an optical port to which an optical cable is connected. Further, the wired interface 111 includes an audio input port to which an external microphone is connected, and an audio output port to which a headset, an earphone, a loudspeaker etc. is connected. Further, the wired interface 111 includes an Ethernet port connected to a gateway, a router, a hub, etc. for connection with the WAN.

The wireless interface 112 includes an interactive communication circuit including at least one of elements such as a communication module, a communication chip, etc. corresponding to various kinds of wireless communication protocols. For example, the wireless interface 112 includes a Wi-Fi communication chip for wireless communication with the AP based on Wi-Fi; a communication chip for wireless communication based on Bluetooth, Zigbee, Z-Wave, Wireless HD, wireless gigabits (WiGig), near field communication (NFC), etc.; an infrared (IR) module for IR communication; a mobile communication chip for mobile communication with a mobile device; etc.

The electronic apparatus 100 may include a display 120. The display 120 forms a screen for displaying an image based on an image signal processed by the processor 170. The display 120 includes a display panel, and the display panel may be designed to have various structures. For example, the display 120 may include a display panel having a light-receiving structure like liquid crystal, and a backlight unit illuminating the display panel. Alternatively, the display 120 may include a display panel having a self-emissive structure like an organic light emitting diode (OLED). Alternatively, the display 120 may have a structure for forming a large screen with tiling combination of a plurality of micro light emitting diode (LED) modules.

The electronic apparatus 100 may include a user input 130. The user input 130 includes a circuit related to various kinds of user input interfaces to be controlled by a user to thereby receive a user input. The user input 130 may be variously configured according to the kinds of electronic apparatus 100, and may for example include a mechanical or electronic button of the electronic apparatus 100, various kinds of sensors, a touch pad, a touch screen installed in the display, etc. Alternatively, the user input 130 may include an external input device such as a keyboard, a mouse, a remote controller, etc. which is separated from the electronic apparatus 100 and connected through the interface 110.

The electronic apparatus 100 may include a storage 140. The storage 140 is configured to store digitalized data. The storage 140 includes a nonvolatile storage in which data is retained regardless of whether power is supplied or not, and a volatile memory in which data loaded to be processed by a processor 170 is retained only when power is supplied. The storage includes a flash memory, a hard disc drive (HDD), a solid-state drive (SSD), a read only memory (ROM), etc., and the memory includes a buffer, a random-access memory (RAM), etc.

The electronic apparatus 100 may include a loudspeaker 150. When the processor 170 reproduces predetermined content, the loudspeaker 150 outputs a sound based on an audio signal of the content. The loudspeaker 150 may be installed in the server 100, or may be provided as a separate apparatus. When the loudspeaker 150 is provided as the separate apparatus, the loudspeaker 150 is connected to the interface 110, and the audio signal is transmitted to the loudspeaker 150 through the interface 110.

The electronic apparatus 100 may include a microphone or a microphone set 160. The microphone set 160 generates an audio signal by collecting sound generated in surrounding environments of the electronic apparatus 100, and transmits the audio signal to the processor 170. In this embodiment, the microphone set 160 is an element separated from the user input 130, but may be designed to be included in the user input 130.

The electronic apparatus 100 may include the processor 170. The processor 170 includes one or more hardware processors achieved by a central processing unit (CPU), a chipset, a buffer, a circuit, etc. which are mounted on a printed circuit board (PCB). Alternatively, the processor 170 may be designed as a system on chip (SoC). In this embodiment, the processor 170 includes modules corresponding to various processes of a demultiplexer, a decoder, a scaler, an audio digital signal processor (DSP), an amplifier, etc. to display an image based on image content. Here, some or all of such modules may be achieved by the SoC. For example, the demultiplexer, the decoder, the scaler, and the like module related to an image process may be achieved as an image processing SoC, and the audio DSP may be achieved as a chipset separated from the SoC. The processor 170 reproduces predetermined content, thereby outputting a sound of the content through the loudspeaker 150 while an image of the content is displayed on the display 120.

The processor 170 in this embodiment extracts a sound-source component caused by user voice from an audio of sound collected through the microphone set 160, and transmits an audio signal of the corresponding sound-source component to the server 200 through the interface 110. The processor 170 receives a speech recognition result of the audio signal from the server 200, and performs an operation based on the speech recognition result. Alternatively, the processor 170 may be designed to perform speech recognition. In this case, the processor 170 applies speech recognition to the sound-source component based on the user voice, and performs an operation based on the speech recognition result.

The server 200 may also include hardware elements such as an interface 210, a wired interface 211, a wireless interface 212, a user input 230, a storage 240, a processor 270, etc. Such elements of the server 200 are basically similar to those of the same terms in the foregoing electronic apparatus 100, and detailed descriptions thereof will be omitted.

The processor 270 applies a speech recognition process to an audio signal received from the electronic apparatus 100, and transmits a speech-recognition process result to the electronic apparatus 100. Here, the speech recognition process may include various subordinate stages, in which the processor 270 may process all such subordinate stages or may share the subordinate stages with other separate apparatuses. For example, when the speech recognition process is divided into a first stage about a speech-to-text (STT) process for converting an audio signal into a text, and a second stage about a semantic analysis process for deriving a command based on content of the text, the processor 270 may perform both the first stage and the second stage. Alternatively, a separate STT server separately communicating with the server 200 may perform the first stage, and the processor 270 may perform the second stage. In this process, the server 200 may directly receive a text from the STT server, or the electronic apparatus 100 may receive the text from the STT server and then transmit to the server 200. In other words, the electronic apparatus 100 may autonomously perform both the STT process and the semantic analysis process, or may transmit an audio signal to an STT server, receive a text from the STT server, and perform the semantic analysis with regard to the text.

Alternatively, when the electronic apparatus 100 performs the speech recognition process, the processor 170 of the electronic apparatus 100 may perform the first stage and the second stage of the foregoing speech recognition process. Alternatively, the electronic apparatus 100 may transmit an audio signal to the STT server so that the STT server can perform the first stage, and then perform the second stage with the text received from the STT server.

Meanwhile, there are many methods by which the electronic apparatus 100 collects sound from surrounding environments. Below, various examples of receiving an audio signal will be described.

Figure 2:
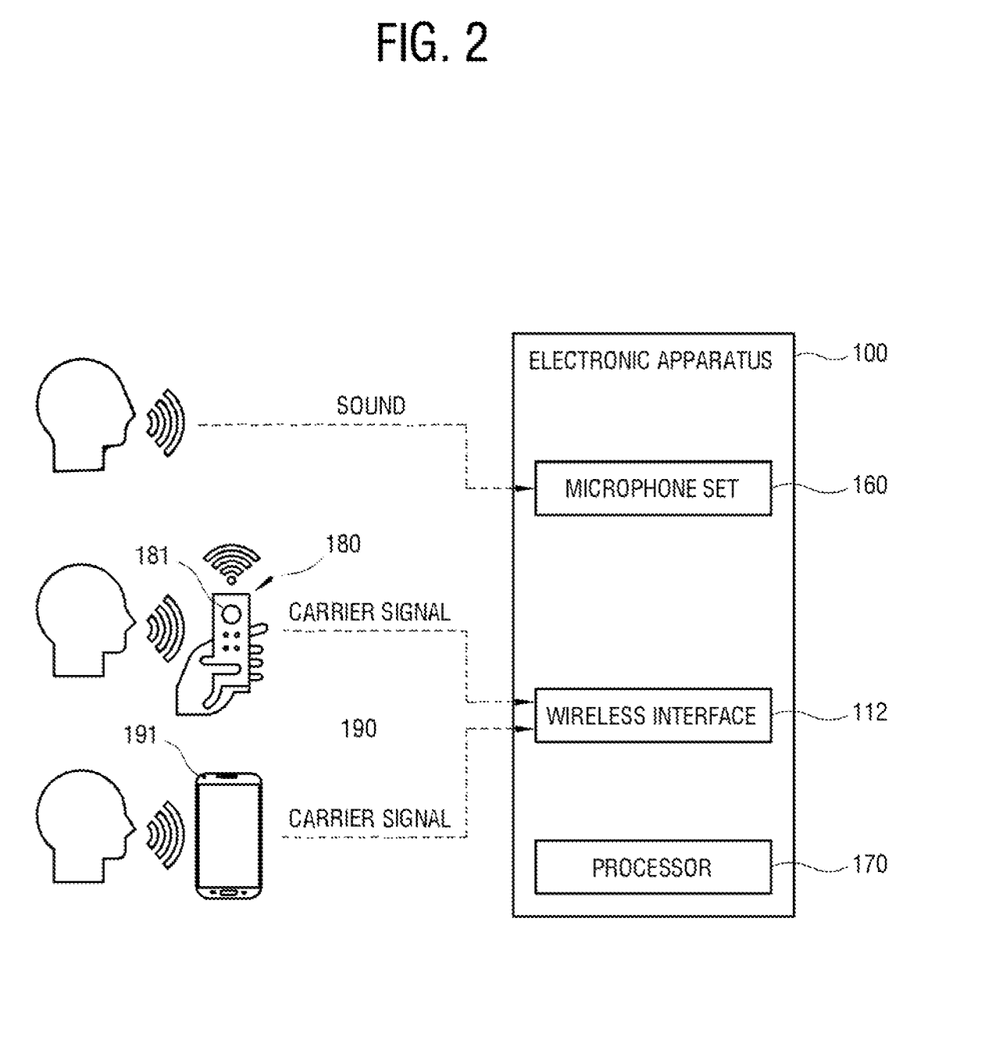
FIG. 2 illustrates various methods by which an electronic apparatus collects user voice.

FIG. 2 shows various methods by which an electronic apparatus 100 collects a sound of a user's voice.

As shown in FIG. 2, as an example of collecting the user voice, the electronic apparatus 100 may collects sound of surrounding environments through the microphone set 160 provided in the main body of the electronic apparatus 200. The microphone set 160 transmits an audio signal based on the collected sound of the surrounding environments to the processor 170. The microphone set 160 may be always activated to collect the sound of the surrounding environments. Alternatively, the microphone set 160 may be inactivated or be in a standby mode not to collect a sound, and then activated to collect a sound when a specific condition is satisfied. Such a condition may be variously designed. For example, the condition may be satisfied when a level of noise generated in the surrounding environments exceeds a predetermined threshold. Of course, the microphone set 160 may be switched over between the activation and the inactivation in response to a user's input.

As another example of collecting the user voice, a remote controller 180 provided separately from the electronic apparatus 100 may include a microphone set 181, and collect sound of surrounding environments through the microphone set 181. Usually, the remote controller 180 is more likely to be placed close to a user, and therefore the microphone set 181 provided in the remote controller 180 is capable of more clearly collecting a user's voice than the microphone set 160 installed in the main body of the electronic apparatus 100. The remote controller 180 converts an audio signal of a sound collected through the microphone set 181 into a carrier signal based on predetermined transmission standards, and transmits the carrier signal to the wireless interface 112. The carrier signal received in the wireless interface 112 is converted into an audio signal, and the audio signal is transmitted to the processor 170.

The method of switching the microphone set 181 of the remote controller 180 over between the activation and the inactivation may be variously designed. Because the remote controller 180 operates using a built-in battery without being connected to an external power source, it may be an issue with a power efficiency that the microphone set 181 is always activated.

For example, the remote controller 180 may include a toggle button for switching the microphone set 181 over between the activation and the inactivation. A user may control the toggle button so that the remote controller 180 can activate or inactivate the microphone 181.

Alternatively, like the foregoing microphone set 160 provided in the electronic apparatus 100, the remote controller 180 may control whether to activate the microphone set 181. For example, the microphone set 181 may be inactivated or be in a standby mode not to collect a sound, and then activated to collect a sound when a specific condition that a level of noise generated in surrounding environments exceeds a predetermined threshold is satisfied.

Alternatively, as another example of collecting the user voice, when a mobile device 190 such as a smartphone or a tablet device includes a microphone set 191, a sound of surrounding environments may be collected through the microphone set 191. The mobile device 190 may perform an operation related to the electronic apparatus 100 by installing software related to the electronic apparatus 100. For example, when the electronic apparatus 100 is a TV, the mobile device 190 may be installed with a dedicated application for controlling the TV on an operating system. The mobile device 190 may transmit an audio signal of a sound collected through the microphone set 191 to the electronic apparatus 100 under the condition that the corresponding application runs. The mobile device 190 converts the audio signal into a carrier signal, and wirelessly transmits the carrier signal to the wireless interface 112. The carrier signal received in the wireless interface 112 is converted into the audio signal, and then transmitted to the processor 170.

Thus, the electronic apparatus 100 obtains an audio signal corresponding to a sound of surrounding environments by various methods.

Below, operations of the electronic apparatus 100 according to an embodiment will be described.

Figure 3:
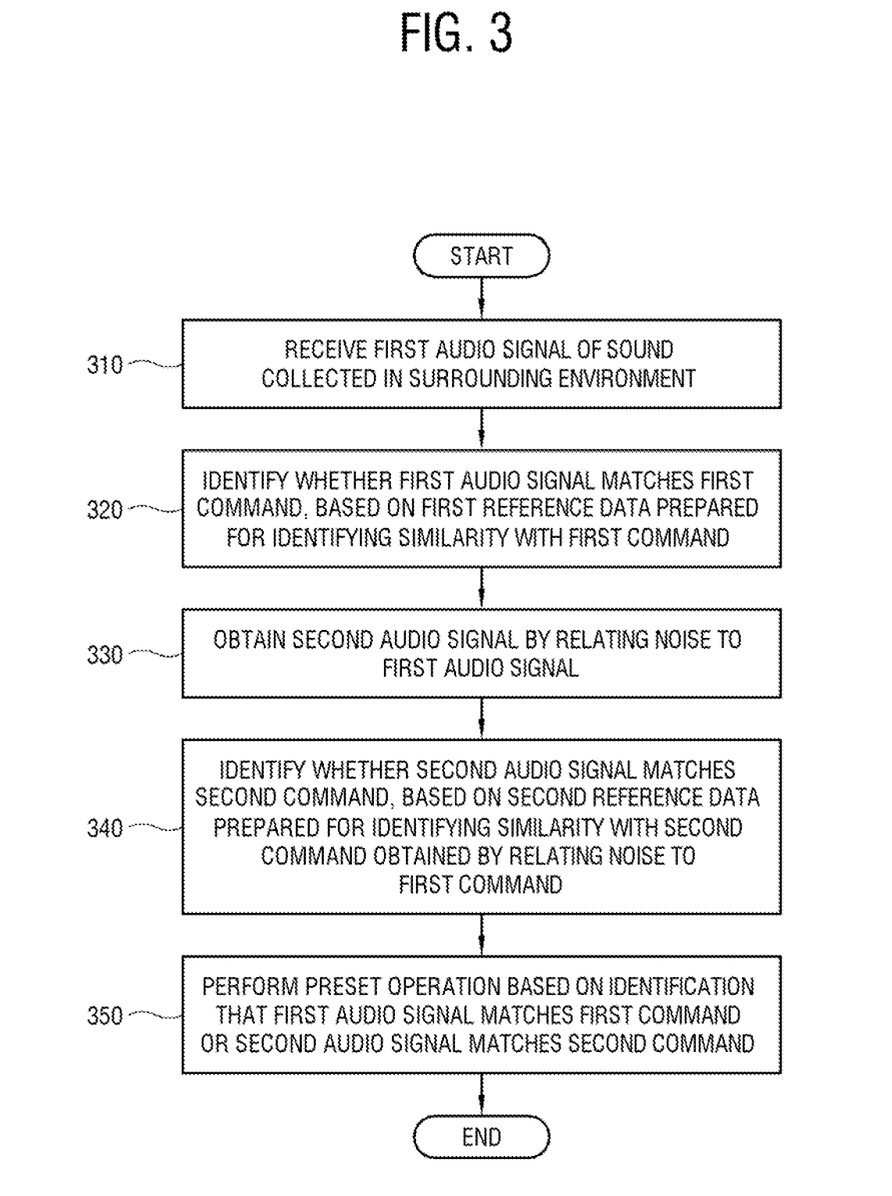
FIG. 3 is a flowchart showing a method of controlling an electronic apparatus.

FIG. 3 is a flowchart showing a method of controlling an electronic apparatus.

As shown in FIGS. 1 and 3, the operations performed by the processor 170 of the electronic apparatus 100 will be described.

At operation 310 the electronic apparatus 100 receives a first audio signal of sound collected in surrounding environments. The first audio signal may for example be generated based on sound collected through the microphone set 160.

At operation 320 the electronic apparatus 100 identifies whether a first audio signal matches a predetermined first command, based on first reference data provided for identifying similarity with the first command. For example, the first reference data corresponds to information (e.g., a database (DB), a table, a model, etc.) generated as the first command voiced by a user under an environment where noise is minimized or excluded (for convenience, referred to as a clean environment) is registered to the electronic apparatus 100.

At operation 330 the electronic apparatus 100 obtains a second audio signal by relating noise to the first audio signal. The second audio signal is, for example, generated as the first audio signal is mixed with previously prepared noise data. In other words, the environment of collecting sound for the second audio signal is substantially the same as a condition that noise is added to the environment of collecting sound for the first audio signal.

At operation 340 the electronic apparatus 100 identifies whether the second audio signal matches a second command, based on second reference data provided for identifying similarity with the second command obtained by relating the noise to the first command. The second reference data may for example be generated by mixing the first command with previously prepared noise data. Here, the noise in the operation 340 refers to the same noise data as the noise in the operation 330.

At operation 350 the electronic apparatus 100 performs a preset operation based on the first command matching the first audio signal or the second command matching the second audio signal. The preset operation may for example be an operation of identifying a user who voices the first audio signal, but not limited thereto. Alternatively, the preset operation may include various operations previously designed without being limited to a certain operation.

Like this, the electronic apparatus 100 according to an embodiment can improve accuracy of identifying an audio of sound collection under an environment where an audio of sound caused by user voice is collected and subjected to speech recognition. The accuracy may be related to various considerations for the audio of the sound collection, and may for example be related to identification of a user who voices the audio of the sound collection, extraction of the sound-source component voiced by the user from the audio of the sound collection.

Meanwhile, the processor 170 of the electronic apparatus 100 may perform at least a part of data analysis, data process and result information generation based on at least one of machine learning, neural network, deep learning algorithms as a rule-based or artificial intelligence (AI) algorithm in order to perform an operation of identifying whether the first audio signal matches the first command based on the first reference data, and an operation of identifying whether the second audio signal matches the second command based on the second reference data.

For example, the processor 170 of the electronic apparatus 100 may function as a learner and a recognizer. The learner may perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the storage of the electronic apparatus 100 or from the outside. The learning data may be data used for learning the neural network, and the data subjected to the foregoing operations may be used as the learning data for learning of the neural network.

Before learning of the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network which is set to perform the operations.

The learned neural network may include a plurality of neural networks (or layers). The nodes of the plurality of neural networks have weighted values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage of the electronic apparatus 100 or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

In the foregoing embodiment, all the operations are performed by the electronic apparatus 100. However, in the speech recognition the system, all the operations are not performed by the electronic apparatus 100, and some operations may be performed by an external apparatus, for example, the server 200 communicating with the electronic apparatus 100. Below, such an embodiment will be described.

At operation 310 the electronic apparatus 100 receives a first audio signal of sound collected in surrounding environments. The electronic apparatus 100 transmits a received audio signal to the server 200.

At operation 320 the server 200 identifies whether the first audio signal matches a predetermined first command, based on the first reference data provided for identifying the similarity with the first command.

At operation 330 the server 200 obtains a second audio signal by relating noise to the first audio signal At operation 340 the server 200 identifies whether the second audio signal matches a second command, based on second reference data provided for identifying similarity with the second command obtained by relating the noise to the first command.

At operation 350 the server 200 performs a preset operation based on the first command matching the first audio signal or the second command matching the second audio signal. For example, the server 200 may identify a user who voices the first audio signal, and transmit an operation command related to an account of the identified user to the electronic apparatus 100, thereby allowing the electronic apparatus 100 to perform an operation based on the corresponding command.

In this way, the electronic apparatus 100 may receive the first audio signal and perform a final result based on the first audio signal, while the server 200 performs a major identification operation.

Below, detailed examples of the operations performed in the foregoing stages will be described.

Figure 4:
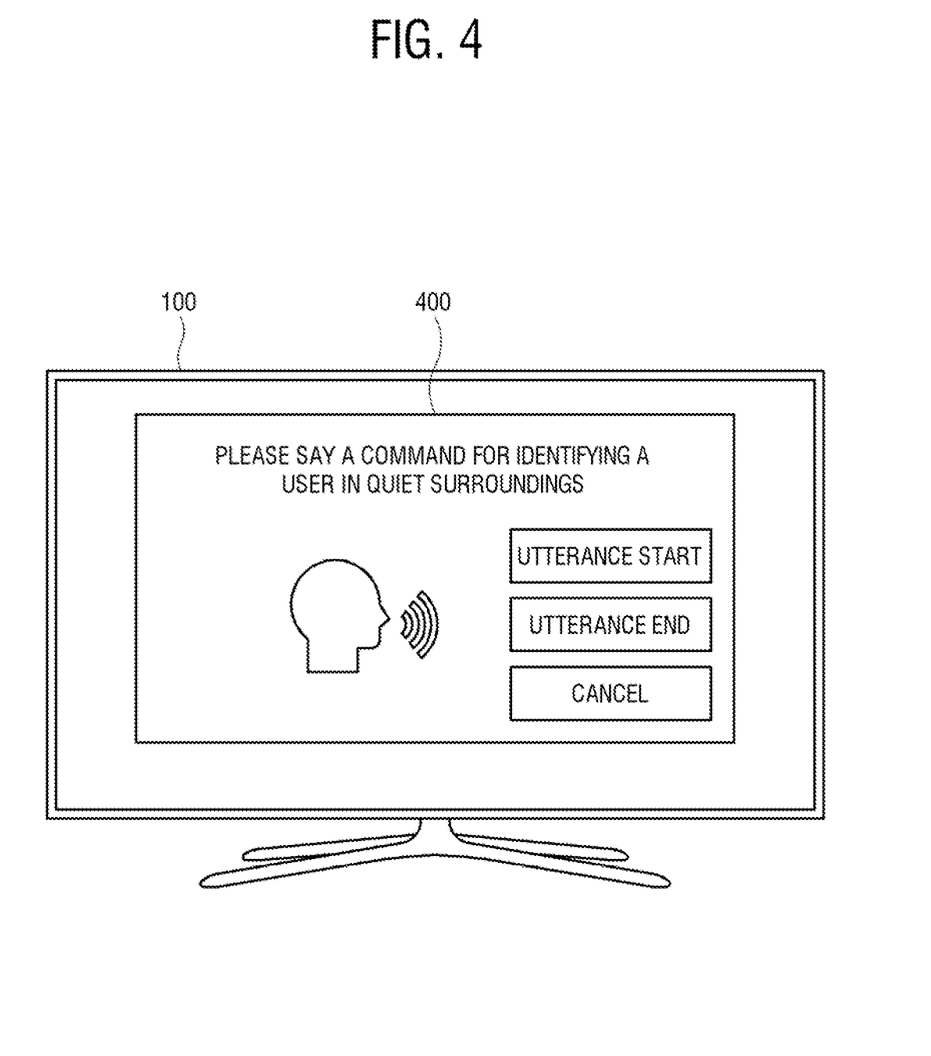
FIG. 4 illustrate that an electronic apparatus displays a user interface (UI) for guiding first reference data to be generated.

FIG. 4 illustrate that an electronic apparatus displays a user interface (UI) for guiding first reference data to be generated.

Figure 5:
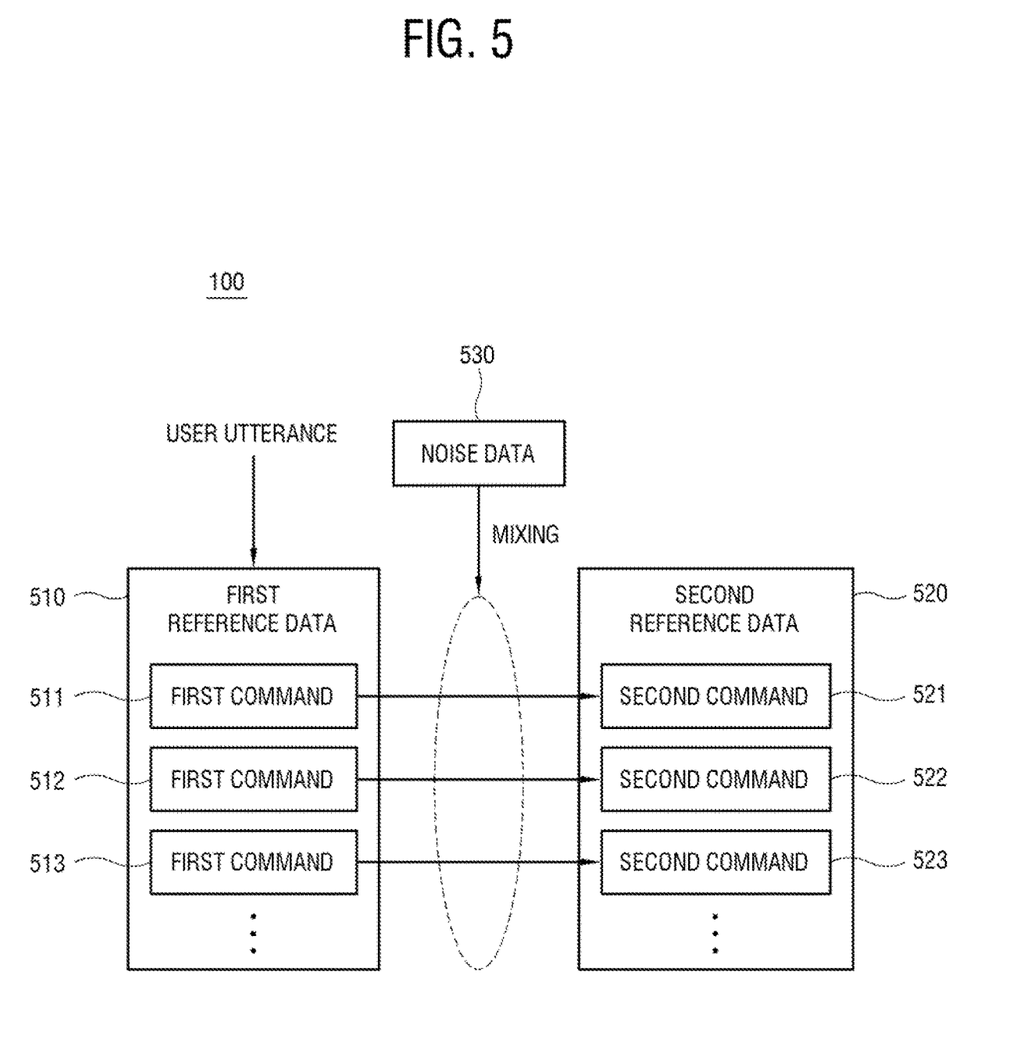
FIG. 5 illustrates a principle that second reference data related to noise data is generated from first reference data.

FIG. 5 illustrates a principle that second reference data related to noise data is generated from first reference data.

As shown in FIGS. 4 and 5, the electronic apparatus 100 previously generates and stores first reference data 510 and second reference data 520. For example, the first reference data 510 may be provided in a stage of manufacturing the electronic apparatus 100. Alternatively, the electronic apparatus 100 may generate the first reference data 510 based on a user's voice input after the user purchases the electronic apparatus 100. In this case, the electronic apparatus 100 guides the operation for generating the first reference data 510 to a user through a UI 400 or the like, and generates the first reference data 510 based on an audio received following the guide of the UI 400.

For example, the UI 400 includes a message of guiding a user to voice predetermined first commands 511, 512 and 513; and options such as a menu for instructing utterance voice start of the first commands 511, 512 and 513, a menu for instructing utterance voice end of the first commands 511, 512 and 513, a menu for instructing canceling, etc. Further, the UI 400 may include a message of guiding a user to make voice under an environment with as low noise as possible (i.e., under the clean environment) so as to more correctly collect sound of the first commands 511, 512 and 513.

There may be various examples to be given as the first commands 511, 512 and 513 that the UI 400 guides a user to voice. The electronic apparatus 100 may guide a user to voice specific commands, which are usually expected to be frequently used, for example "power on", "power off", "volume up", "volume down", "next channel", "previous channel", etc. through the UI 400.

When one or more first commands 511, 512 and 513 are received while a user logs in to the electronic apparatus 100 with a predetermined account, these first commands 511, 512 and 513 are registered corresponding to the user's account, thereby generating the first reference data 510. The first reference data 510 refers to a set of data registered with a user account, in which the first commands 511, 512 and 513 collected under a predetermined environment (i.e., the clean environment) guided by the electronic apparatus 100 are identifiable, and may be provided according to a plurality of users. Alternatively, the electronic apparatus 100 may generate the first reference data 510 as a plurality of first commands 511, 512 and 513 respectively voiced by a plurality of users are registered corresponding to user accounts. There are no limits to the number and content of first commands 511, 512 and 513 corresponding to one user.

When the first reference data 510 is generated as above, the electronic apparatus 100 relates previously prepared noise data 530 to the first reference data 510, thereby generating second reference data 520. There are various methods of relating the noise data 530 to the first reference data 510. As an example, there is a method of generating second commands 521, 522 and 523 by mixing data of the first commands 511, 512 and 513 in the first reference data 510 with the noise data 530. A result of mixing the first commands 511, 512 and 513 with the noise data 530 is substantially the same as a result of collecting sound of the first commands 511, 512 and 513 collected in an environment with the corresponding noise. The electronic apparatus 100 obtains the second commands 521, 522 and 523 by respectively mixing the first commands 511, 512 and 513 with the noise data 530, and generates the second reference data 520 including such obtained second commands 521, 522 and 523.

This embodiment shows that one piece of noise data 530 is used. However, two or more pieces of noise data 530 may be used. Below, a method of generating the second reference data 520 when there are two or more pieces of noise data 530 will be described.

Figure 6:
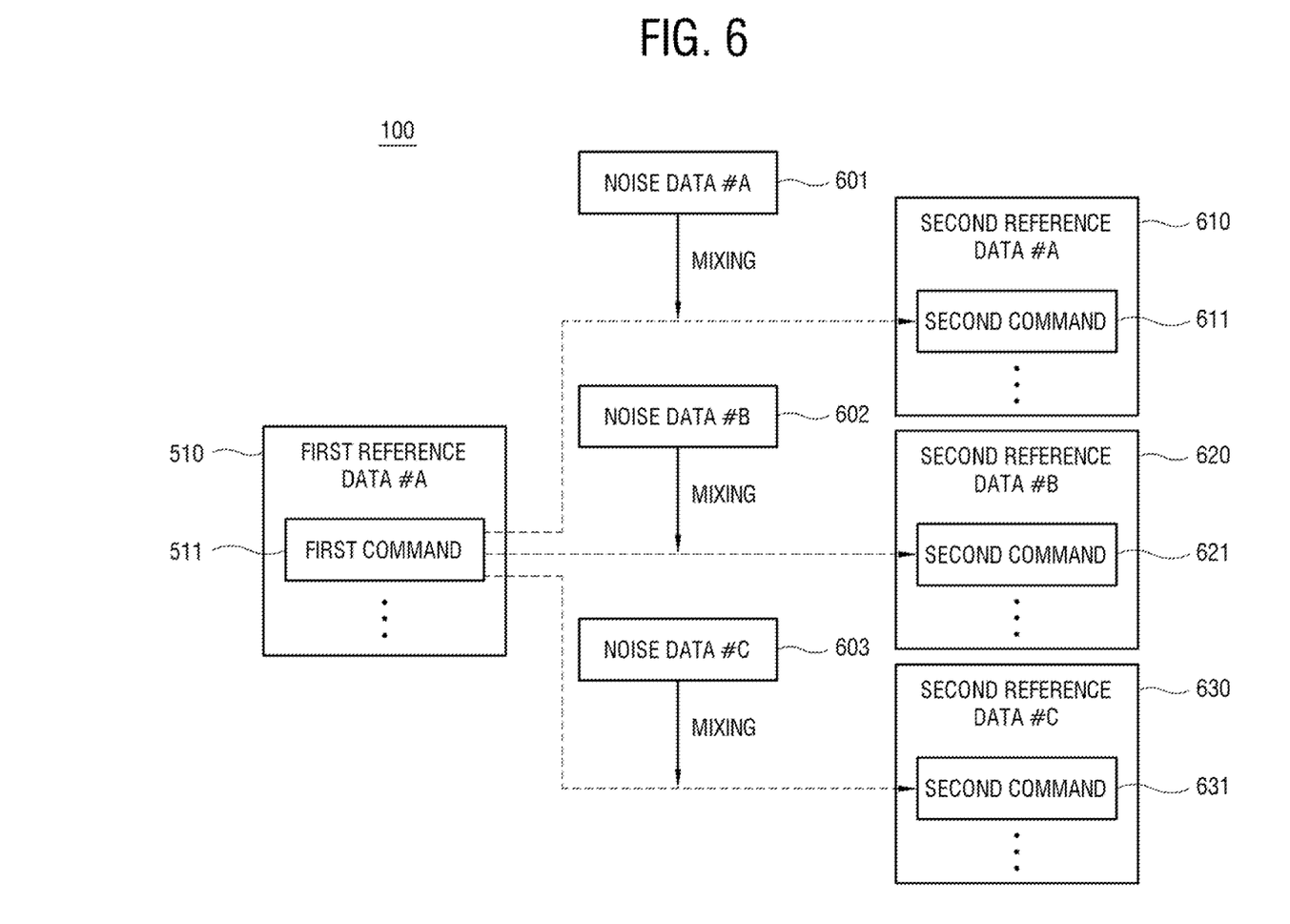
FIG. 6 illustrates a method of generating a plurality of pieces of second reference data by reflecting a plurality of pieces of noise data in first reference data.

FIG. 6 illustrates a method of generating a plurality of pieces of second reference data by reflecting a plurality of pieces of noise data in first reference data.

As shown in FIG. 6, for example, when there are three pieces of noise data 601, 602 and 603, the electronic apparatus 100 generates three pieces of second reference data 610, 620 and 630 by reflecting the noise data 601, 602 and 603 in the first reference data 510. The electronic apparatus 100 generates second reference data #A 610 for identifying similarity with a second command 611 obtained by mixing the first command 511 of the first reference data 510 with noise data #A 601, generates second reference data #A 620 for identifying similarity with a second command 621 obtained by mixing the first command 511 with noise data #B 602, and generates second reference data #A 630 for identifying similarity with second command 631 obtained by mixing the first command 511 with noise data #C 603.

In this way, the electronic apparatus 100 may obtain N pieces of second reference data 610, 620 and 630 based on one piece of first reference data 510 caused by user voice and N pieces of previously prepared noise data 601, 602 and 603. The noise data 601, 602 and 603 may be previously prepared in consideration of the sound collection environment of the electronic apparatus 100 in the stage of manufacturing the electronic apparatus 100 and stored in the electronic apparatus 100, or may be downloaded from a server to the electronic apparatus 100. For example, various pieces of noise data 601, 602 and 603 may be prepared by actual sound collection under various sound-collection environments of the electronic apparatus 100. Alternatively, various sound-collection environments of the electronic apparatus 100 may be implemented by virtual simulation, and the noise data 601, 602 and 603 may be prepared in this simulation. Alternatively, the noise data 601, 602 and 603 may be prepared by various audio-related software jobs in a computer.

Alternatively, the electronic apparatus 100 may obtain the noise data 601, 602 and 603 from a sound collection environment in real time during operation. For example, the electronic apparatus 100 analyzes an audio of sound collected from a surrounding environment, extracts data identified as noise from the analyzed audio, and stores the extracted data as the noise data 601, 602 and 603. The electronic apparatus 100 collects sound from a surrounding environment periodically or at a specific point in time. The electronic apparatus 100 obtains the noise data 601, 602 and 603 from other sound-source components than a sound-source component corresponding to user voice among a plurality of sound-source components when the audio of collected sound includes the plurality of sound-source components. Alternatively, the electronic apparatus 100 may obtain the noise data 601, 602 and 603 from the audio of the collected sound while voice is not given.

Here, the noise data 601, 602 and 603 may be identified in the electronic apparatus 100 or the server. For example, the electronic apparatus 100 transmits an audio of collected sound to the server, and receives the noise data 601, 602 and 603, which is extracted from the corresponding audio, from the server. Such identification of the noise data 601, 602 and 603 may for example be performed by artificial intelligence.

Below, a method, by which the electronic apparatus 100 identifies a user who voices an audio signal of collected sound based on the first reference data 510 and the second reference data 610, 620 and 630, will be described.

Figure 7:
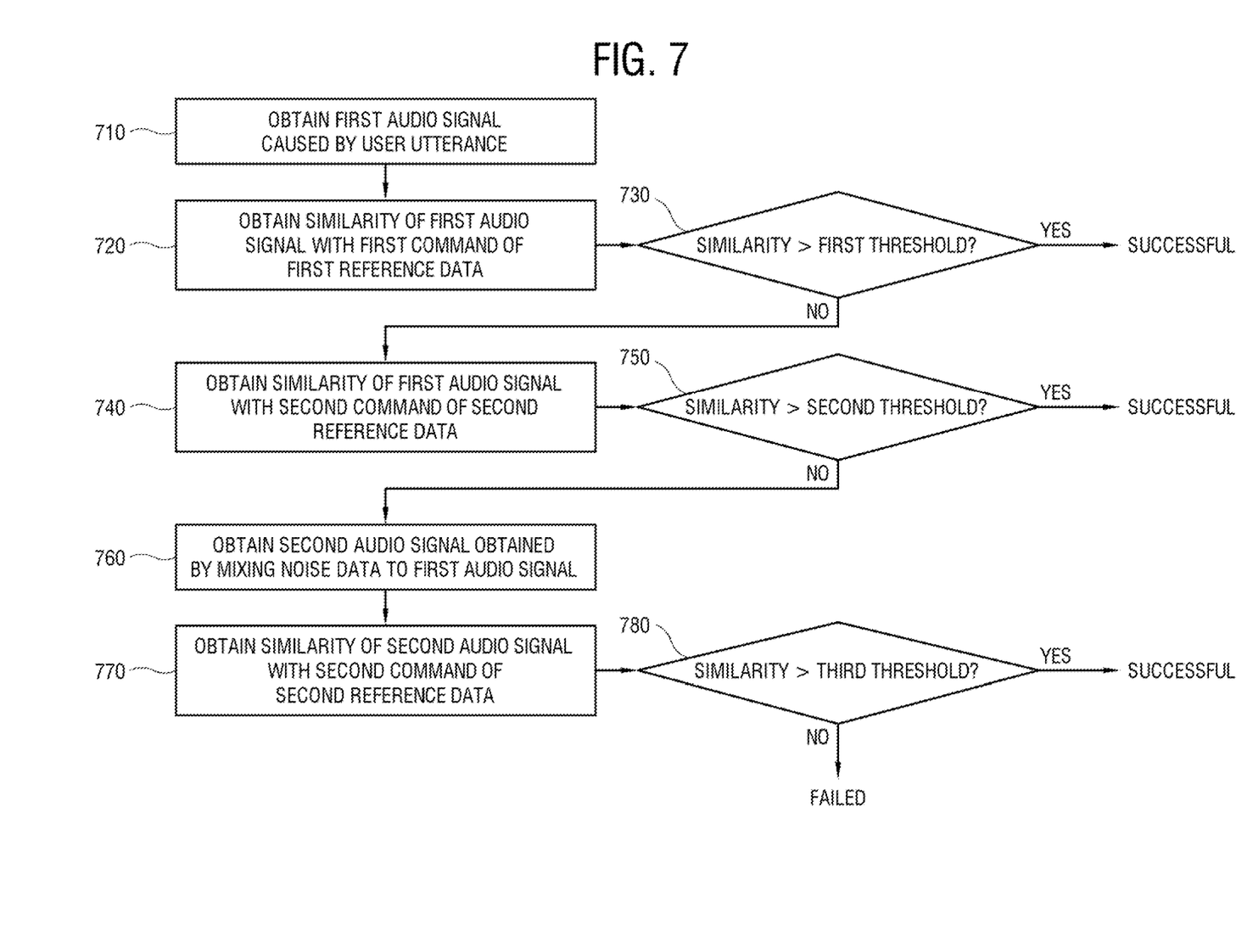
FIG. 7 is a flowchart showing a process that an electronic apparatus identifies a user who makes voice based on first reference data and second reference data.

FIG. 7 is a flowchart showing a process that an electronic apparatus identifies a user who makes voice based on first reference data and second reference data.

As shown in FIGS. 5 and 7, the electronic apparatus 100 has the first reference data 510 and the second reference data 520. The first reference data 510 and the second reference data 520 are equivalent to those described in the foregoing embodiments, and thus detailed descriptions thereof will be omitted. This embodiment describes a case where there is one piece of second reference data 520, but this is merely for simple description. The number of pieces of second reference data 520 may be provided corresponding to the number of pieces of noise data 530, and this embodiment may be applied even to a case where there are a plurality of pieces of second reference data 520. Further, this embodiment shows only a case where the first reference data 510 and the second reference data 520 are related to one user, but this embodiment may be applied even to two or more users.

At operation 710 the electronic apparatus 100 obtains a first audio signal caused by user voice (corresponding to the operation 310 in FIG. 3). The first audio signal may be obtained by various sound-collection methods as described above in the embodiments with reference to FIGS. 1 and 2.

At operation 720 the electronic apparatus 100 obtains similarity of the first audio signal with the first command 511 of the first reference data 510. At operation 730 the electronic apparatus 100 compares the obtained similarity and a predetermined first threshold. When the obtained similarity exceeds the first threshold (see "YES" in the operation 730), the electronic apparatus 100 identifies that a user identification result is successful, and terminates a user identification process (in other words, identifies a user who voices the first audio signal as a valid user registered in the first reference data 510). The operations 720 and 730 in this embodiment are equivalent to the operation 320 and a part of the operation 350 (i.e., the operation of identifying whether the first audio signal matches the first command) in FIG. 3.

On the other hand, when the obtained similarity does not exceed the first threshold (see "NO" in the operation 730), at operation 740 the electronic apparatus 100 obtains similarity of the first audio signal with the second command 521 of the second reference data 520. At operation 750 the electronic apparatus 100 compares the obtained similarity and a predetermined second threshold. When the obtained similarity exceeds a second threshold (see "YES" in the operation 750), the electronic apparatus 100 identifies that the user identification result is successful, and terminates the user identification process.

On the other hand, when the obtained similarity does not exceed the second threshold (see "NO" in the operation 750), at operation 760 the electronic apparatus 100 obtains a second audio signal by mixing the first audio signal with the noise data 530 (see the operation 330 in FIG. 3).

At operation 770 the electronic apparatus 100 obtains similarity of the second audio signal with the second command 521 of the second reference data 520. At operation 780 the electronic apparatus 100 compares the obtained similarity and a predetermined third threshold. When the obtained similarity exceeds a third threshold (see "YES" in the operation 780), the electronic apparatus 100 identifies that the user identification result is successful, and terminates the user identification process.

On the other hand, when the obtained similarity does not exceed the third threshold (see "NO" in the operation 780), the electronic apparatus 100 identifies that the user identification result is failed (in other words, identifies that a user who voices the first audio signal is not the user registered in the first reference data 510), and performs a previously-prepared separate handling operation. This handling operation may for example be a user identification process based on the first reference data 510 and the second reference data 520 related to another user. Alternatively, when it is identified that the first reference data 510 and the second reference data 520 related to another user to be referenced are not present, the electronic apparatus 100 may display a message that a user who voices the first audio signal is not identifiable.

The operations 770 and 780 in this embodiment are equivalent to the operation 340 and a part of the operation 350 (i.e., the operation of identifying whether the second audio signal matches the second command) in FIG. 3.

This embodiment shows that the similarity of the first audio signal with the first reference data 510, the similarity of the first audio signal with the second reference data 520, and the similarity of the second audio signal with the second reference data 520 are all checked, but some processes may be designed not to be performed. For example, the operations 740 and 750 may be skipped among the whole processes, and thus the operation 760 may be carried out right after the operation 730.

Meanwhile, the first threshold, the second threshold, and the third threshold in this embodiment are given to identify how similar the first audio signal or the second audio signal is to the first command 511 or the second command. Below, concept of the thresholds will be described.

Figure 8:
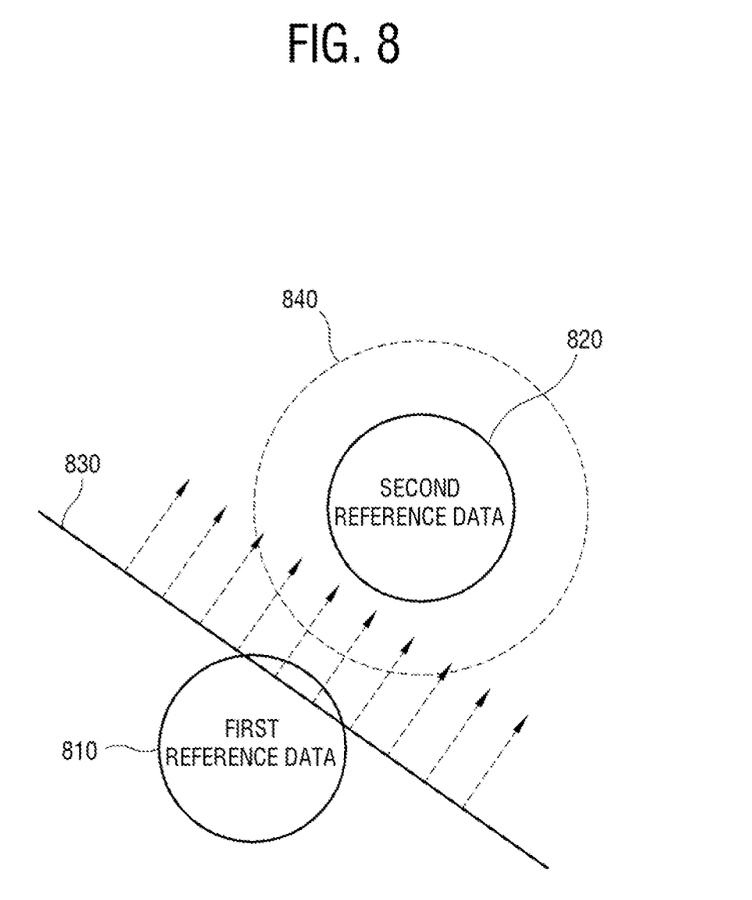
FIG. 8 illustrates a similarity-related range on a plane, based on thresholds of a first audio signal, a first command and a second command.

FIG. 8 illustrates a similarity-related range on a plane, based on thresholds of a first audio signal, a first command and a second command.

As shown in FIGS. 5, 7 and 8, the first reference data 510 and the second reference data 520 are projected onto a plane, and areas of command-recognizable ranges are represented on the plane based on the first reference data 510 and the second reference data 520. For convenience, the area of the first reference data 510 will be called a first area 810, and the area of the second reference data 520 will be called a second area 820. On a vector plane, a boundary line defining the first area 810 is the first threshold (see the operation 730 in FIG. 7), and a boundary line defining the second area 820 is the second threshold (see the operation 750 in FIG. 7).

When the first audio signal caused by the user voice is projected on the plane, it is possible to identify where the first audio signal is positioned on the plane. When the first audio signal is positioned within the first area 810, this shows a case where the similarity of the first audio signal with the first reference data 510 exceeds the first threshold, in the operation 730 of FIG. 7, i.e., shows that the first audio signal is within an area recognizable as the first command. On the other hand, when the first audio signal is positioned beyond the first area 810, this shows a case where the similarity does not exceed the first threshold, in the operation 730 of FIG. 7, i.e., shows that the first audio signal is beyond an area recognizable as the first command.

Further, when the first audio signal is positioned within the second area 820, this shows a case where the similarity of the first audio signal with the second reference data 520 exceeds the second threshold, in the operation 750 of FIG.

7, i.e., shows that the first audio signal is within an area recognizable as the second command. On the other hand, when the first audio signal is positioned beyond the second area 820, this shows a case where the similarity does not exceed the second threshold, in the operation 750 of FIG. 7, i.e., shows that the first audio signal is beyond an area recognizable as the second command.

When the first audio signal is converted into the second audio signal as mixed with the noise data 530, the position of the second audio signal on the plane is closer to the second area 820 than the position of the first audio signal. A line 830 on the plane indicates the position of the first audio signal. When the first audio signal is mixed with the noise data 530, this line 830 moves toward the second area 820. Further, in this case, the area related to the second reference data is expanded from the second area 820 based on the second threshold to a third area 840 based on the third threshold (see the operation 780 in FIG. 7). The third area 840 includes the entire second area 820 and an area around the second area 820.

When the second audio signal is positioned between the outside of the second area 820 and the inside of the third area 840, this shows a case where the similarity of the second audio signal with the second reference data 520 exceeds the third threshold, in the operation 780 in FIG. 7, i.e., shows that the second audio signal is within an area recognizable as the second command. On the other hand, when the second audio signal is positioned at the outside of the third area 840, this shows a case where the similarity does not exceed the third threshold, in the operation 780 in FIG. 7, i.e., shows that the second audio signal is beyond an area recognizable as the second command. Like this, the electronic apparatus 100 generates the second audio signal by mixing the first audio signal with the noise data 530, and identifies the similarity of the second audio signal with the second reference data 520 based on the noise data 530, thereby finally improving the accuracy of identifying a user who voices the first audio signal.

The operations of the apparatus described in the foregoing embodiments may be implemented by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning technology and algorithms based on an algorithm of autonomously classifying and learning features of input data, and copying perception, identification and the like functions of a human brain The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program instruction that can be implemented in various computers, and recorded in a computer readable medium. Such a computer readable medium may include a program instruction, a data file, a data structure or the like, or combination thereof. For example, the computer readable medium may be stored in a nonvolatile storage such as universal serial bus (USB) memory, regardless of whether it is deletable or rewritable, for example, a RAM, a ROM, a flash memory, a memory chip, an integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program instruction recorded in this storage medium may be specially designed and configured according to the embodiments, or may be publicly known and available to those skilled in the art of computer software. Further, the computer program instruction may be implemented by a computer program product.

What is claimed is:

1. An electronic apparatus comprising
a microphone;
a memory to store first reference data including a first command and second reference data generated by adding noise data to the first reference data, the second reference data including a second command generated by adding noise data to the first command; and
a processor configured to:
receive a first audio signal of sound through the microphone;
obtain a second audio signal by mixing the noise data, which is same noise data added to the first command, to the received first audio signal;
identify whether the obtained second audio signal matches the second command of the second reference data; and
perform an operation in response to the identifying that the obtained second audio signal matches the second command.

2. The electronic apparatus according to claim 1, wherein the processor is further configured to identify a user who voices the first audio signal as a user corresponding to the first command, in response to the identifying that the second audio signal matches the second command.

3. The electronic apparatus according to claim 2, wherein the processor is further configured to provide a message of failing to identify a user who voices the first audio signal, in response to the identifying that the second audio signal does not match the second command.

4. The electronic apparatus according to claim 1, wherein the processor is further configured to identify that the second audio signal matches the second command, based on similarity exceeding a preset value between the second command and the second audio signal.

5. The electronic apparatus according to claim 1, wherein the processor is further configured to identify that the first audio signal matches the first command, based on similarity exceeding a first setting value between the first command and the first audio signal.

6. The electronic apparatus according to claim 5, wherein the processor is further configured to identify that the first audio signal matches the first command, based on similarity exceeding a second setting value between the second command and the first audio signal.

7. The electronic apparatus according to claim 1, wherein the processor is further configured to obtain the first command voiced by a user in a surrounding environment from which the noise is excluded, and register the first command to the first reference data.

8. The electronic apparatus according to claim 1, wherein the processor is further configured to obtain the second command based on the first command and the noise, and register the second command to the second reference data.

9. The electronic apparatus according to claim 8, wherein the processor is further configured to obtain the second audio signal based on the first audio signal and the noise.

10. The electronic apparatus according to claim 1, wherein the processor is further configured to obtain data about the noise from an audio signal acquired through the microphone.

11. A method of controlling an electronic apparatus having a microphone and a memory to store first reference data including a first command and second reference data generated by adding noise data to the first reference data, the second reference data including a second command generated by adding noise data to the first command, comprising:

receiving a first audio signal of sound through the microphone;

obtaining a second audio signal by mixing the noise data, which is same noise data added to the first command, to the received first audio signal, identifying whether the obtained second audio signal matches the second command obtained of the second reference data; and performing an operation in response to the identifying that the obtained second audio signal matches the second command.

12. The method according to claim 11, further comprising identifying a user who voices the first audio signal as a user corresponding to the first command, in response to the identifying that the second audio signal matches the second command.

13. The method according to claim 12, further comprising providing a message of failing to identify a user who voices the first audio signal, in response to the identifying that the second audio signal does not match the second command.

14. The method according to claim 11, further comprising identifying that the second audio signal matches the second command, based on similarity exceeding a preset value between the second command and the second audio signal.

* * * * *